United States Patent [19]

Popovich

[11] Patent Number: 5,590,205
[45] Date of Patent: Dec. 31, 1996

[54] ADAPTIVE CONTROL SYSTEM WITH A CORRECTED-PHASE FILTERED ERROR UPDATE

[75] Inventor: Steven R. Popovich, Stoughton, Wis.

[73] Assignee: Digisonix, Inc., Middleton, Wis.

[21] Appl. No.: 297,241

[22] Filed: Aug. 25, 1994

[51] Int. Cl.$^6$ .................................................. G06F 15/00
[52] U.S. Cl. ................................................ 381/71; 381/94
[58] Field of Search .............................. 381/71, 94, 97, 381/73.1, 93; 318/561

[56] References Cited

U.S. PATENT DOCUMENTS

| | | | |
|---|---|---|---|
| 4,677,676 | 6/1987 | Eriksson | 381/71 |
| 4,677,677 | 6/1987 | Eriksson | 381/71 |
| 4,950,966 | 8/1990 | Moulds, III | 318/561 |
| 5,049,795 | 9/1991 | Moulds, III | 318/561 |
| 5,164,647 | 11/1992 | Moulds, III | 318/561 |
| 5,216,721 | 6/1993 | Melton | 381/71 |
| 5,216,722 | 6/1993 | Popovich | 381/71 |
| 5,294,933 | 3/1994 | Lee et al. | 342/159 |
| 5,299,148 | 3/1994 | Gardner et al. | 364/574 |
| 5,347,586 | 9/1994 | Hill et al. | 381/71 |

OTHER PUBLICATIONS

"Development of the Filtered–U Algorithm for Active Noise Control" L. J. Eriksson, Journal of Acoustic Society of America., 89(1), Jan., 1991, pp. 257–265.

*Primary Examiner*—Stephen Brinich
*Attorney, Agent, or Firm*—Andrus, Sceales, Starke & Sawall

[57] ABSTRACT

An adaptive control system that can be used for active acoustic attenuation implements an LMS or an RLMS update using an error signal that is filtered through a delayed Hermitian transpose of a C model of an auxiliary path following an adaptive control filter. Adaptive on-line C modeling can be used effectively. The invention is useful in SISO and MIMO applications, and can reduce the number of filtering operations in systems using several reference signals. The invention does not require inverse C modeling.

47 Claims, 4 Drawing Sheets

ADAPTIVE CONTROL SYSTEM WITH A CORRECTED-PHASE FILTERED ERROR UPDATE

BACKGROUND

The invention relates to adaptive control systems and, in particular, to adaptive control systems for active acoustic attenuation.

Active acoustic attenuation involves injecting a canceling acoustic wave, such as sound or vibration, to destructively interfere with and cancel an input acoustic wave. The output acoustic wave is sensed with an error sensor such as a microphone in a sound system or an accelerometer in a vibration system. An error input signal is supplied to an adaptive control filter, and adaptive parameters in the filter are updated in relation to the error input signal to adapt the filter.

The adaptive control filter model receives a reference or input signal and in turn supplies a correction signal to an output transducer such as a loudspeaker in a sound application or a shaker in a vibration application. The output transducer injects a canceling acoustic wave to destructively interfere with the input acoustic wave so that the output acoustic wave at the error sensor is zero or some other desired value. In a feedforward system, the reference or input signal is obtained using an input sensor located upstream of the canceling transducer. The input sensor can be in a sound system or an accelerometer in a vibration system. In a feedback system, the reference or input signal to the adaptive control filter model is typically an error signal from the error sensor or a signal derived therefrom.

It is important that the adaptive control filter in an active acoustic attenuation system be stable (i.e. converge), and also that the adaptive filter be robust. The filtered-X least-mean-square (LMS) and the filtered-U recursive-least-mean-square (RLMS) update methods as described in U.S. Pat. No. 4,677,676 which is incorporated herein by reference, are effective means of providing adaptive control in many active acoustic attenuation applications. In the filtered-X LMS method, a C model of an auxiliary path after the output of the adaptive control filter (e.g. the speaker-error path in sound applications) filters the reference signal. the filtered reference signal is the regressor to an error correlator which correlates the error signal from the error sensor to generate an error input signal that updates the adaptive control filter. The C modeling of the auxiliary path can be accomplished off-line, or preferably adaptively on-line such as described in the above incorporated U.S. Pat. No. 4,677,676. The filtered-U RLMS method can be accomplished in a similar fashion as disclosed in U.S. Pat. No. 4,677,676.

Delayed inverse C modeling is another method for implementing the LMS update. In that method, the error signal is filtered through an inverse of a delayed C model, and the reference signal is delayed to generate the regressor to the error correlator.

Multiple input, multiple output (MIMO) adaptive control filters are often desirable. Such a MIMO system can have multiple output transducers and/or multiple error sensors and/or multiple input sensors, and has an adaptive control filter with a plurality of adaptive filter channels. Such a MIMO system is described in U.S. Pat. Nos. 5,216,721 and 5,216,722 which are incorporated herein by reference.

The filtered-X LMS and filtered-U RLMS update methods are effective means of providing control for MIMO systems, but the complexity of these methods increases rapidly as the number of input sensors, output transducers, or error sensors grows. For example, a MIMO system having an adaptive FIR (finite impulse response) control filter using the filtered-X LMS update with m reference signals, n output transducers and p error sensors entails the generation of m×n×p filtered reference signals with p updates per filter channel. Implementing the filtered-X or filtered-U update can easily become computationally burdensome in MIMO applications.

In MIMO applications, it is not always practical to implement the delayed inverse C modeling when using the preferred technique of adaptive on-line C modeling. This is because of difficulties that may be associated with inverting the C model. Also, inverting the C model on-line can be a computational burden. Another problem with delayed inverse C modeling is that inverting the C model inherently skews convergences.

It is therefore desirable to provide an adaptive control system and method that is robust and convergent, yet does not have the drawbacks of delayed inverse C modeling, and is not as computationally burdensome as the filtered-X or filtered-U methods in MIMO applications.

SUMMARY OF THE INVENTION

The present invention is a corrected-phase filtered error adaptive control system and method that ensures convergence of the LMS or RLMS update methods for an adaptive control filter. The invention is an adaptive control system and method that uses an error signal filter implementing a delayed Hermitian transpose of a C model of an auxiliary path following an adaptive filter (i.e., the matrix transfer function of the error signal filter in the frequency domain is an approximation of a delayed Hermitian transpose of the C model of the auxiliary path). In a single output single error application, the error signal filter becomes a delayed complex conjugate of the C model of the auxiliary path. One advantage of the invention is that the delayed Hermitian transpose of the C model in the frequency domain can be implemented in the time domain with a relatively small amount of signal processing.

The invention can be implemented in a single input, single output (SISO) application or in multiple input, multiple output (MIMO) application. The invention can be used in feedforward, pure feedback and equation-error feedback control systems.

It is preferred that the adaptive control filter in the control system be an FIR transversal filter that is updated using the LMS update. It is also preferred that the error signal filter be generated using an on-line, adaptive C model of the auxiliary path.

An adaptive control system implementing the invention requires less on-line processing than on-line delayed inverse C modeling. Also, the invention does not skew the amplitude of the C model tap weights, and thus converges with the same cost function as the filtered X method. Also, an adaptive control system implementing the invention can require less filtering operations than the filtered-X method, especially in MIMO applications having a large number of reference signals.

The invention is well-suited for active acoustic attenuation, having an adaptive control filter.

BRIEF DESCRIPTION OF THE DRAWINGS

Prior Art

Present Invention

DETAILED DESCRIPTION

Prior Art

Figure 1:
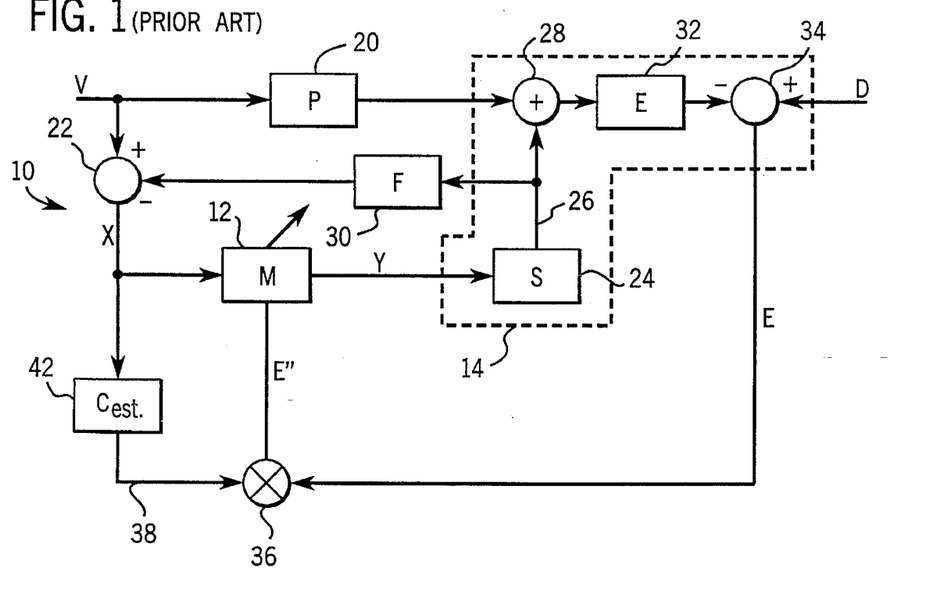
FIG. 1 is a schematic illustration of an adaptive control system implementing a filtered-X LMS update as is known in the prior art.

FIG. 1 shows an active acoustic attenuation system with an adaptive control system implementing the filtered X LMS update in the frequency domain. In the active acoustic attenuation system 10, a system input V (e.g., an input acoustic wave in an acoustic attenuation system 10) is introduced to a system propagation path or system plant 20, and also to an input sensor 22. The input sensor generates a reference signal X that is processed in an adaptive filter 12 to generate a correction signal Y. The correction signal Y is output to an output transducer 24. The output transducer 24 generates a control signal shown schematically to be present in line 26 (e.g., a canceling acoustic wave in acoustic attenuation system). The canceling acoustic wave in line 26 combines with the input acoustic wave V after the input acoustic wave V propagates through the system path 20 as shown schematically by summing junction 28. The canceling acoustic wave in line 26 can also propagate back through acoustic feedback path 30 to input sensor 22. In this case, the input sensor 22 senses not only the input acoustic wave V, but also the acoustic feedback of the canceling acoustic wave.

The combined input and canceling acoustic waves propagate through an error path 32 to yield a system output that is sensed by an error sensor 34. The error sensor 34 generates an error signal E that is the difference between the system output and the desired system output D. In an active acoustic attenuation system, it is typical for the desired system output D to be equal to zero.

The error signal E is transmitted to a correlator 36, which is typically a multiplier, to implement the LMS update. In the correlator 36, the error signal E is multiplied by a filtered-X regressor in line 38. The correlator 36 provides an error input signal E" to the adaptive filter 12 in line 40 to update tap weights in adaptive filter 12. In the filtered-X method, the reference signal X is typically filtered through a filter 42 that includes an auxiliary path 14. The auxiliary path 14 is often referred to as the C path, or in active sound attenuation applications the speaker-error path. In FIG. 1, the auxiliary path 14 is the path between the output of the adaptive filter 12 and the input to the correlator 36. The C filter 42 can be estimated, determined adaptively off-line, or determined adaptively on-line as described in U.S. Pat. No. 4,677,676.

In the above acoustic automation system 10 shown in FIG. 1, the adaptive filter 12 is typically a transversal finite impulse response (FIR) filter. However, as described in U.S. Pat. Nos. 4,677,676 and 4,677,677, which is also incorporated herein by reference, the adaptive filter 12 can be an infinite impulse response (IIR) filter. If adaptive filter 12 is an IIR filter the filtered-U recursive least means square (RLMS) update should be used as disclosed in U.S. Pat. No. 4,677,676.

The filtered-X or filtered-U update methods can be implemented in a feedforward system as is shown in FIG. 1, or in a feedback system. In a feedback system, the error signal E, or derivation thereof, is the reference signal X. For further background, reference can be made to "Development of the Filtered-U Algorithm for Active Noise Control", L. J. Eriksson, *Journal of Acoustic Society of America,* 89(1), January, 1991, pages 257–265.

U.S. Pat. Nos. 5,216,721 and 5,216,722 describe a feedforward and a feedback multiple input, multiple output (MIMO) system implementing a filtered-U RLMS or a filtered-X LMS update method. In such a MIMO system 10, using an FIR adaptive filter 12 with m reference signals X, n correction signals Y, and p error signals E, the system 10 requires that each of the m reference signals X be filtered through p×n filter channels in the C filter 42, and that each filter channel in adaptive filter 12 receive p updates.

Figure 2:
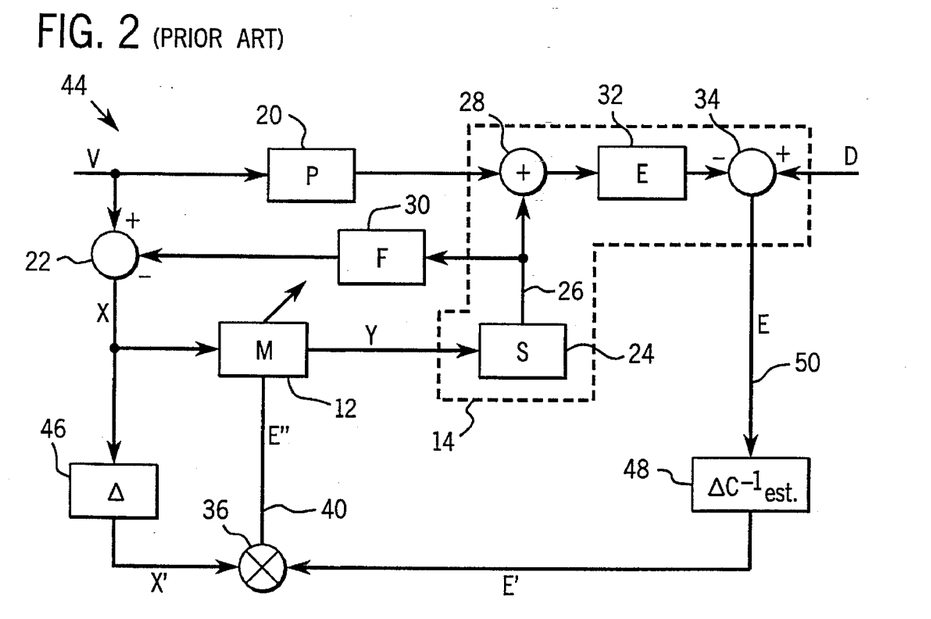
FIG. 2 is a schematic illustration of an adaptive control system implementing an LMS update with delayed inverse C modeling as is known in the prior art.

FIG. 2 shows another feedforward system 44 implementing the LMS or RLMS update method for active acoustic attenuation. The system 44 in FIG. 2 is an inverse C model system 44 as is also described in U.S. Pat. No. 4,677,676 and the above referred reference to "Development of the Filtered-U Algorithm for Active Noise Control", L. J. Eriksson, *Journal of Acoustic Society of America,* 89(1), January, 1991, pages 257–265. The system 44 in FIG. 2 is similar in many respects to the filtered-X system shown in FIG. 1 and like reference numbers are used where appropriate to facilitate understanding.

In FIG. 2, the C filter 42 shown in FIG. 1 is replaced with a delay element 46. Also, a delayed inverse C model filter 48 is added in FIG. 2 to filter the error signal E. The delay inverse C model filter 48 filters the error signal E from the error sensor 34 in line 50 before transmitting an error signal to the correlator 36. The delayed inverse C model filter 48 transmits a filtered error signal E' to the correlator 36 where E' is multiplied with a regressor X' that is a delayed reference signal X. The delay element 46 delays the reference signal X so that the regressor X' is substantially in phase with the filtered error signal E'. The correlator 36 transmits an error input signal E" in line 40 to update the adaptive tap weights in the adaptive filter 12.

In general, the delayed inverse C model filter 48 can be determined on-line by adapting the filter 48 such that the combination of filter 48 and auxiliary path 14 model a delay. A substantial amount of delay may be required to effectively inverse model the auxiliary path. The phase in the filtered error signal E' is adjusted from the phase of the error signal E by the delayed inverse C model filter 48 so that the LMS update converges. However, the delayed inverse C model system 44 shown in FIG. 2 does not converge with the same cost function as the filtered-X method shown in FIG. 1. The delayed inverse C model filter 48 not only adjusts the phase of the error signal, but also adjusts the amplitude of the error signal because inverting the C model inherently skews the inverse C model filter 48.

In MIMO applications, the delayed inverse C model system 44 in FIG. 2 can be impractical, or even impossible, to implement. For instance, in a system 44 operating in the time domain with an p×n auxiliary path 14, the C model can be represented by p×n adaptive channels each containing a series of tap weights. Inverting the C model requires transforming into the z-domain, inverting, and transforming back to the time domain. This is a burden to process, and restricts the use of adaptive on-line C modeling. Furthermore, there are many situations in which the C model cannot be inverted (e.g., the C model is not square, or the C model contains one or more singular or nearly singular values).

The invention is a system and a method for implementing a least mean square (LMS) or a recursive least mean square (RLMS) update in an adaptive filter 12 when there are transfer functions in an auxiliary path 14 following the adaptive filter 12. The invention is depicted in FIGS. 3–7 in which error signals, represented as E in the frequency domain and e(k) in the time domain, are filtered and then correlated with a delayed version of reference signals represented as X in the frequency domain and x(k) in the time domain. In particular, the error signals are filtered through an error signal filter 18 that includes a delayed Hermitian transpose of a C model of the auxiliary path 14 between the output of the adaptive filter 12 and the input of the error signal filter 18.

Present Invention

Figure 3:
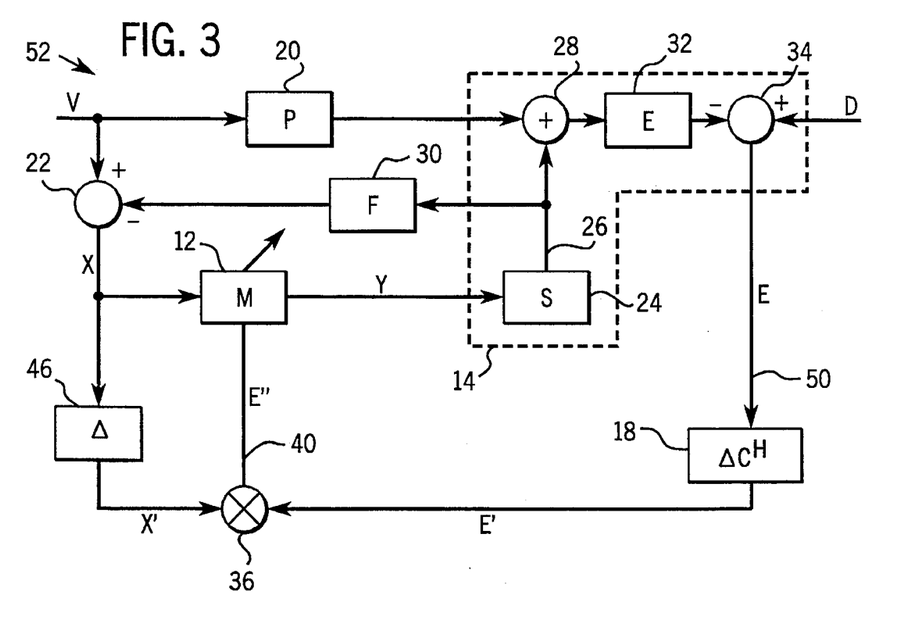
FIG. 3 is a schematic illustration of a feedforward adaptive control system in accordance with he present invention.

FIG. 3 shows a feedforward active acoustic attenuation system 52 that implements an LMS or an RLMS update in accordance with the present invention. The system 52 shown in FIG. 3 is depicted in the frequency domain as are the prior art system 10 shown in FIG. 1, and the prior art system 44 shown in FIG. 2. Like reference numbers are used in FIGS. 1–3 where appropriate to facilitate understanding of the invention. As discussed above, the invention has a corrected-phase error signal filter 18 with a delayed Hermitian transpose of a C model of the auxiliary path 14 in the frequency domain, which can be implemented in the time domain. If system 52 has one correction signal Y and one error signal E, the C model will have a single channel and the delayed Hermitian transpose of the C model is a delayed complex conjugate of the C model.

Figure 4:
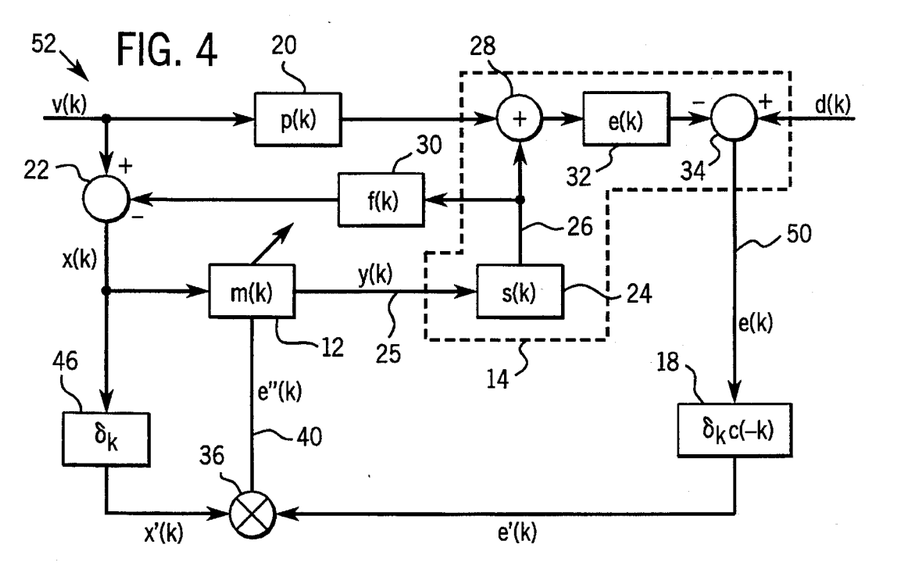
FIG. 4 is a schematic illustration showing the system in FIG. 3 in the time domain.
Figure 5:
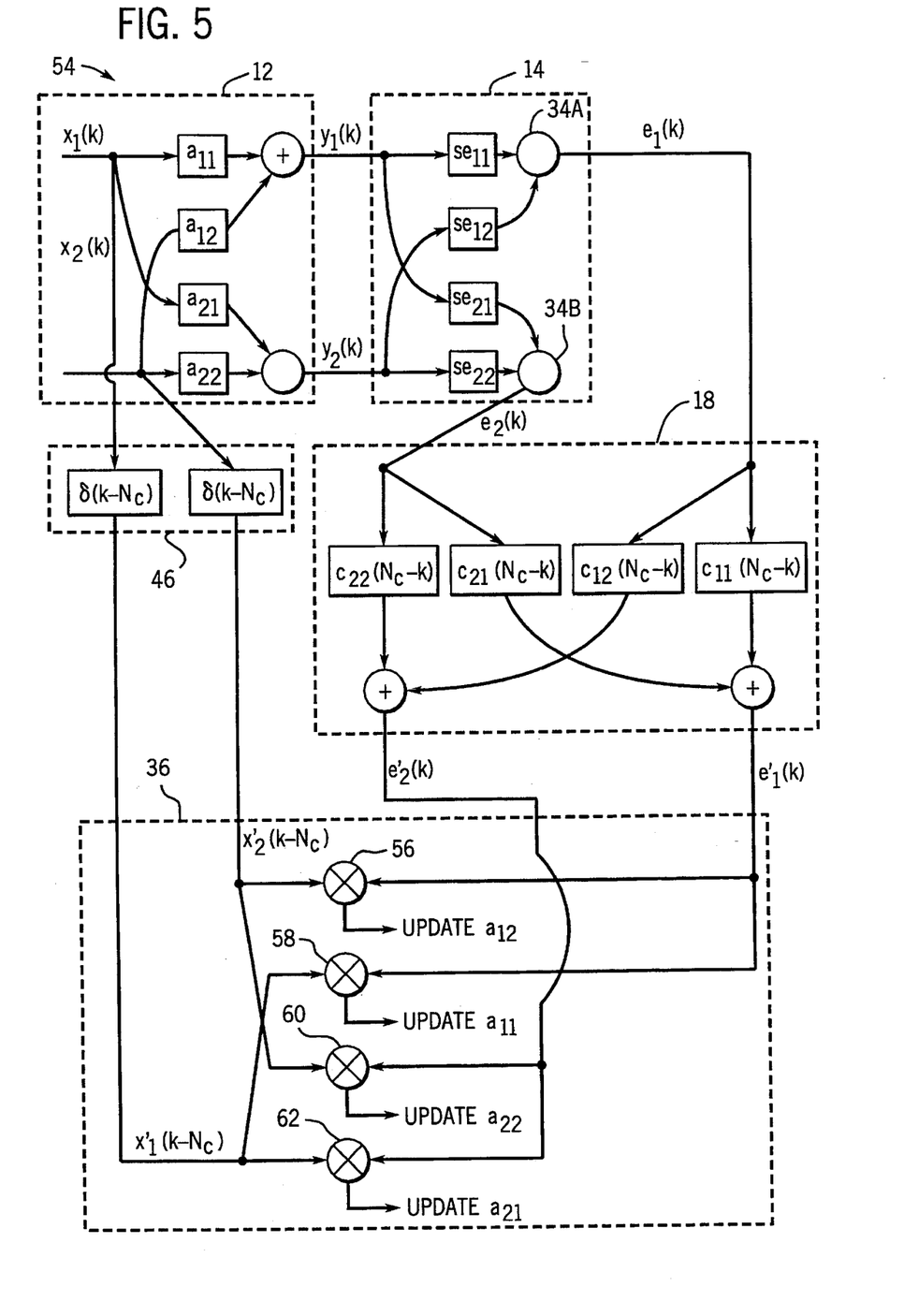
FIG. 5 is a schematic illustration showing a feedforward multiple input multiple output system of the present invention in the time domain.

In FIG. 4, the system 52 is shown in the time domain. The argument (k) is a discrete time index. The system 52 in FIG. 4 is illustrated as a SISO system with a single input, x(k), single output y(k), and single error input e(k), but can be extended to a system with m reference signals x(k), n output or correction signals y(K) and p error signals e(k). A 2×2×2 system 52 (i.e., an example of an m×n×p system 52) is shown in FIG. 5.

Referring to the SISO system 52 shown in FIG. 4, in the preferred embodiment, the adaptive filter 12 is a transversal FIR filter with $N_n$ delay elements. Reference signal x(k) is input to the adaptive filter 12 and the adaptive filter 12 outputs a correction signal y(k). The adaptive filter 12 generates the correction signal y(k) by multiplying a sequence of time delayed reference signals, e.g., x(k) . . . x(k–$N_n$), by a series of adaptive tap weights and summing the results. While it is preferred that the adaptive filter 12 be an adaptive transversal FIR filter, the invention can be used with other types of adaptive filters 12 such as an adaptive IIR filter or even a non-transversal adaptive filter.

The correction signal y(k) is transmitted to an output transducer which is represented by block 24. In an active acoustic attenuation system, the output transducer 24 is preferably an actuator which is a loudspeaker in a sound application and a shaker in a vibration application. The output transducer 24 outputs a control signal in line 26. In an active attenuation system, the control signal 26 is a canceling acoustic wave, such as a sound wave in a sound application or a vibration in a vibration application.

The control signal in line 26 propagates back through the system feedback path 30 (e.g. an acoustic feedback path in an acoustic application) to an input sensor 22. The input sensor 22 senses not only the system input v(k) but also the control signal feedback, and generates the reference signal x(k). In a sound application, the input sensor 22 is preferably a microphone, and in a vibration application the input sensor 22 can be an accelerometer.

The system input v(k) (e.g., an input acoustic wave in an acoustic attenuation system) propagates through the system propagation path 20 and is combined with the control signal 26 (e.g., the canceling acoustic wave in an active acoustic attenuation system) as depicted by summing junction 28. After summing junction 28, the combined signal or wave propagates through an error path 32, and the system output is detected by error sensor 34. The error sensor 34 outputs an error signal e(k) in line 50. In general, the error signal e(k) is the difference between the system output detected by the error sensor 34 and the desired system output d(k). In an acoustic attenuation application, the desired output is typically zero. In a sound application, the error sensor 34 can be an error microphone, and in a vibration application the error sensor 34 can be an accelerometer.

The auxiliary path 14 is the path between the output of the adaptive filter, which can be represented by line 25, and the input of the error signal filter 18 which can be represented by line 50. In the system 52 shown in FIG. 4, the auxiliary path 14 is depicted as a speaker-error path in an active sound attenuation system. However, the invention is not limited to applications where the auxiliary path 14 is a speaker-error path, or an analogous path in an another type of system. That is, the auxiliary path 14 may include additional impulse response functions downstream of the adaptive filter 12. On the other hand, it may not be necessary to include all the impulse response functions downstream of the adaptive filter 12 (e.g., a system in which the speaker path 24 is known to be unity).

The error signal e(k) inputs the error signal filter 18 which generates a filtered error signal e'(k) that has a corrected phase for proper correlation in generating the error input signal e"(k) in line 40. In general, the error signal filter 18 has one or more channels corresponding to a delayed Hermitian transpose of a C model of the auxiliary path 14. In the case where the C model contains a single channel, the delayed Hermitian transpose of the C model is the delayed complex conjugate of the C model. In a system 52 having more than one error signal $e(k)_s$, the error signal filter 18 also has a summer 64 and 66 for each filtered error signal e'(k) output from the filter 18.

The C model of the auxiliary path 14 can be accomplished off line, or preferably adaptively on line as described in U.S. Pat. No. 4,677,676. The C model is preferably an FIR transversal filter with $N_c$ delay elements and $N_c$ tap weights. In the preferred corrected phase filtered error system 52 of the present invention, $N_c$ is relatively small, such as in the range of 30–50. While it is preferred that the C model be an adaptive FIR transversal filter, other types of adaptive or non-adaptive C models can be used.

The C model of the auxiliary path 14 can model over the broad band frequency range, or in some applications it may be preferable that the auxiliary path 14 be modeled only over selected frequency ranges. When the C model of the auxiliary path 14 models over selected frequency ranges only, the error signal filter 18 with a delayed C Hermitian transpose will correct the phase of the error signals only over the selected frequencies.

Referring in particular to the SISO system 52 in FIG. 4, the delayed C model complex conjugate in filter 18 can be accomplished in the time domain by reversing the order of the tap weights in the C model. That is, flipping the discrete time impulse about the origin, and shifting to the right $N_c$ discrete time steps, so that the filter 18 is causal. This procedure requires little or no processing and is computationally less burdensome than inverting the C model of the auxiliary path 14 as is required in delayed inverse C modeling (shown in FIG. 2). Because of the ease in which the delayed C model complex conjugate can be formed, the system 52 of the present invention can easily accommodate the use of an on-line adaptive C model as described in U.S. Pat. No. 4,677,676. Also, the delayed C model complex conjugate filter 18 of the present invention does not skew the amplitude of the tap weights in the C model, and thus has the same cost function as the filtered-X LMS update shown in FIG. 1.

In some circumstances, it may not be necessary to shift the elements of the reverse C model for the entire $N_c$ taps. It may be sufficient to delay the elements of the C model only as long as the effective response time of the auxiliary path 14 as modeled in the C model.

In order to implement the LMS update, the filtered error signal e'(k) is multiplied in correlator 36 by a regressor that is a delayed reference signal x'(k). The reference signal (k) is delayed in a delay element 46 for preferably the same amount of delay as the delay in the error signal filter 18. The LMS update will, however, converge as long as the delayed reference signal x'(k) is within 90° phase of the filtered error signal e'(k). The error input signal e"(k) from the correlator 36 inputs the adaptive filter 12 to update the tap weights in the adaptive filter 12 in accordance with the LMS algorithm.

The system 52 can be extended to implement an RLMS update if the adaptive filter 12 is an IIR filter. In the RLMS case, an additional correlator is preferably provided for the recursive filter element. The filtered error signal e'(k) is correlated with a regressor that is a delayed version of the recursive input signal y(k) to provide an error input signal for recursive filter element.

FIG. 5 shows a feedforward 2×2×2 MIMO system 54 in accordance with the present invention. In general, the invention can be applied to a MIMO system having m reference signals, n correction signals and p error signals (i.e., m×n×p), and the 2×2×2 system shown in FIG. 5 is illustrative of the generalized m×n×p system. The MIMO system 54 has two reference signals $x_1(k)$ and $x_2(k)$ which input the adaptive FIR filter 12. The adaptive filter 12 outputs two correction signals $y_2(k)$ and $y_2(k)$. The adaptive filter 12 has 2×2 adaptive channels which are labeled $a_{11}$, $a_{12}$, $a_{21}$ and $a_{22}$. The correction signals $y_1(k)$ and $y_2(k)$ are transmitted to the auxiliary path 14. The correction signals $y_1(k)$ and $y_2(k)$ propagate through the auxiliary path, and combine with the system input to yield a system output which is sensed by two error sensors 34A and 34B to generate error signals $e_1(k)$ and $e_2(k)$. In FIG. 5, the auxiliary path 14 is represented by 2×2 auxiliary paths $se_{11}$, $se_{12}$, $se_{21}$ and $se_{22}$ between the respective correction signals $y_1(k)$ and $y_2(k)$ and error signals $e_1(k)$ and $e_2(k)$. The auxiliary paths $se_{11}$, $se_{12}$, $se_{21}$ and $se_{22}$ are shown as speaker-error paths, but the invention is not limited to compensating for speaker-error paths as discussed above. Note that summing junction 28 shown in FIGS. 3 and 4, as well as the desired output D or d(k) shown in FIGS. 3 and 4 does not appear in FIG. 5 for the sake of simplicity. The auxiliary path 14 is preferably modeled on-line with a C model having 2×2 (i.e., p×n) adaptive channels such as disclosed in U.S. Pat. Nos. 5,216,721 and 5,216,722, and 4,677,676. The p×n notation is convenient to represent a p×n matrix that operates on n×1 vector of outputs y to result in a p×1 vector at the error sensor 34.

The two (i.e., p) error signals $e_1(k)$ and $e_2(k)$ input the error signal filter 18. The error signal filter 18 outputs two (i.e. n) filtered error signals $e'_1(k)$ and $e'_2(k)$. The error signal filter 18 has 2×2 (i.e. n×p) filter channels $c_{22}$, $c_{21}$, $c_{12}$ and $c_{11}$. The error signal filter 18 also has two (i.e. n) summers 64 and 66 that sum the output from the individual filter channels to generate the filtered error signals $e'_1$ and $e'_2$, respectively. The filter channels $c_{22}(-k+N_c)$, $c_{21}(-k+N_c)$, $c_{12}(-k+N_c)$ and $c_{11}(-k+N_c)$ can be determined by transposing the channels of the C model of the auxiliary path 14, and taking the delayed complex conjugate of each channel as described above with respect to FIG. 4.

The filtered error signals $e'_1$ and $e'_2$ output the error signal filter 18 and input to a correlator 36. The correlator 36 outputs 2×2 (i.e. n×m) error input signals e"(k) to update the 2×2 (i.e., n×m) adaptive channels in the adaptive filter 12. Each of the reference signals $x_1(k)$ and $X_2(k)$ are delayed in delay element 46 to generate delayed reference signals $X'_1(k-N_c)$ and $X'_2(k-N_c)$ which are regressor input to the correlator 36. The correlator 36 has 2×2 (i.e. n×m) multipliers 56, 58, 60, and 62 that multiply the appropriate regressor $X_1(k-N_c)$ and $X_2(k-N_c)$ with the appropriate filtered error signal $e'_1(k)$ and $e'_2(k)$ to generate an error input signal e"(k) to update the appropriate adaptive channel in the adaptive filter model 12.

It can be appreciated that the 2×2×2 (i.e. m×n×p) MIMO system 54 as illustrated in FIG. 5 requires only n×p filtering operations. Furthermore, the system 54 does not require filtering of reference signals, so the system 54 is especially advantageous in applications where large numbers of reference signals are useful.

The MIMO system 54 can be extended to an RLMS update in a fashion similar to that discussed above with respect to FIG. 4.

Figure 6:
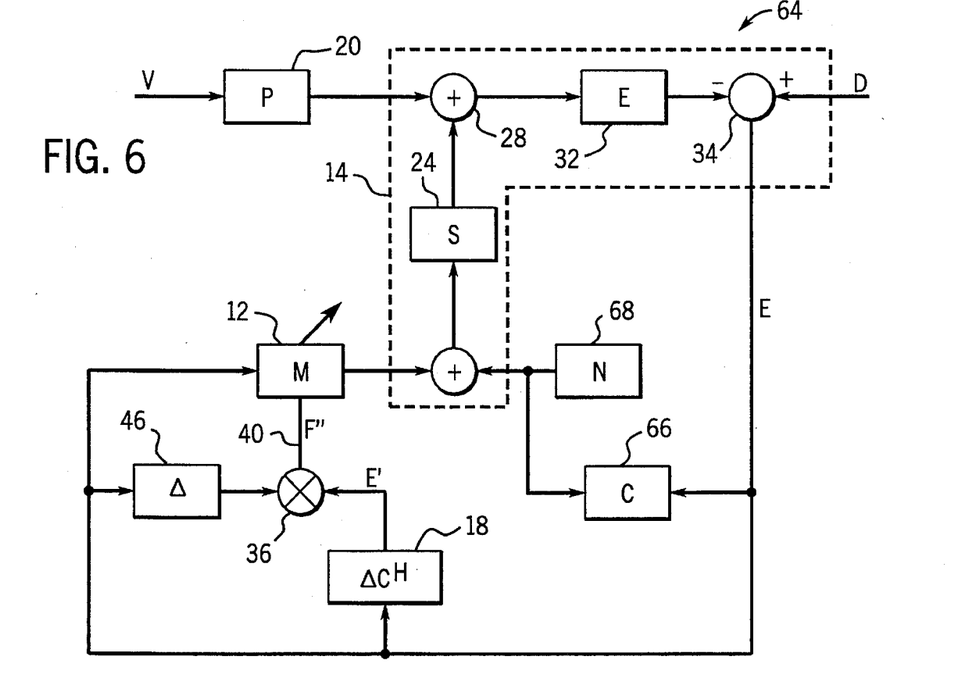
FIG. 6 is a schematic illustration of a pure feedback system in accordance with the present invention.

FIG. 6 shows a pure feedback system 64 in accordance with the present invention. Similar reference numbers and characters are again used where appropriate to facilitate understanding. In the pure feedback system 64, the reference signal input to the adaptive filter 12 is the error signal E from the error sensor 34. If system 64 is a MIMO system, the number of reference signals m may include all of the number of error signals p. The error signal E is filtered through the error signal filter 18 to generate the filtered error signal E'. The filtered error signal E' inputs the correlator 36, and is correlated with a regressor that is a delayed version of the error signal. The delay element 46 delays the error signal E to provide the regressor. The correlator 36 outputs an error input signal E" in-line 40 to the adaptive filter 12. FIG. 6 also shows an adaptive on line C model 66 for modeling the auxiliary path 14 that uses a random noise source 68 in accordance with U.S. Patent Nos. 5,216,722 and 4,677,676.

Figure 7:
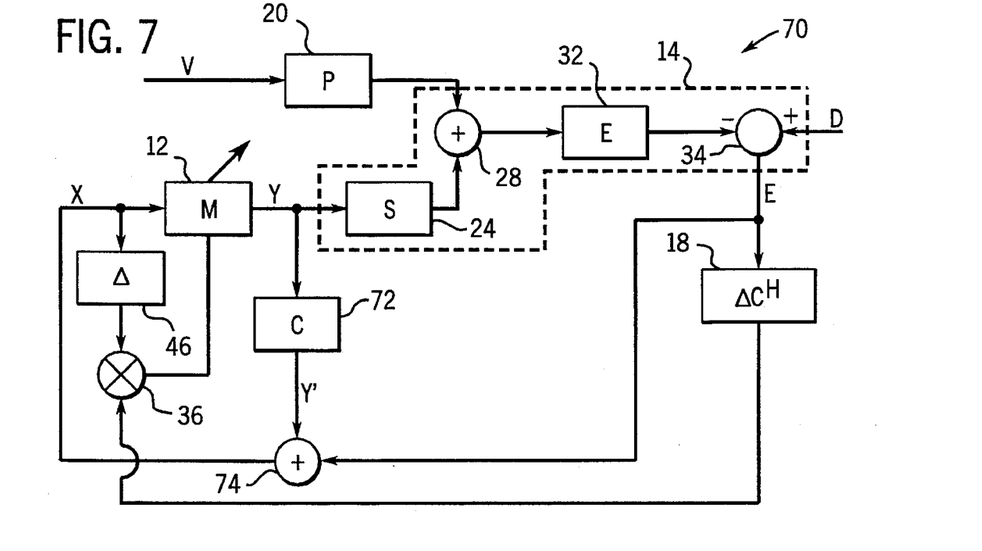
FIG. 7 is a schematic illustration showing an equation error feedback system in accordance with the present invention.

FIG. 7 shows an equation-error feedback system 70 implementing the present invention, again using similar reference numbers and characters where appropriate. In the equation error system 70, the reference signal X to the adaptive filter 12 is formed by summing the error signal E with a filtered correction signal Y' in summer 74. The correction signal Y is filtered through a copy 72 of the C model of the auxiliary path 14 to generate the filtered correction signal $Y^1$. In other respects, the equation error system 70 is implemented in the same fashion as the pure feedback system 64 shown in FIG. 6 and the feedforward system shown in FIGS. 3 and 4. Also, it should be noted that the equation error system 70 can be implemented in a MIMO system as long as the number of p error signals E is equal to the number of m reference signals X.

It is recognized that various equivalents, alternatives, and modifications are possible within the scope of the invention. While the invention herein has been described in association with its preferred applications in active acoustic attenuation, the invention is not limited to such applications. The invention can be used in many applications having adaptive control systems in which an auxiliary path 14 follows the output of an adaptive filter 12.

I claim:

1. An adaptive control system having a system input and a system output, the system comprising:

an adaptive filter that inputs one or more reference signals and one or more error input signals, and outputs one or more correction signals;

one or more output transducers, each output transducer inputting one of the correction signals and outputting a control signal that combines with a system input;

one or more error sensors that senses a system output and outputs an error signal;

an error signal filter that inputs each error signal and outputs one or more filtered error signals, wherein the error signal filter includes a delayed Hermitian transpose of a model of an auxiliary path between the output of the adaptive filter and the input of the error signal filter; and, an error signal correlator that inputs each reference signal and each filtered error signal and outputs the one or more error input signals.

2. A system as recited in claim 1 wherein the error signal filter also includes a summer for each filtered error signal.

3. A system as recited in claim 1 further comprising a delay element that delays each reference signal before the reference signal is input to the error correlator.

4. A system as recited in claim 1 wherein the error correlator has at least one multiplier.

5. A system as recited in claim 4 wherein the adaptive filter has a channel corresponding to a relationship between each reference signal and each correction signal, and the error correlator has a separate multiplier to update each filter element.

6. A system as recited in claim 1 further comprising one or more input sensors, each input sensor outputting one of the reference signals.

7. A system as recited in claim 1 wherein the one or more of the error signals are the one or more reference signals.

8. A system as recited in claim 7 further comprising a delay element that delays each reference signal before the signal inputs the error correlator as a regressor.

9. A system as recited in claim 1 further comprising a copy of the model of the auxiliary path and a summing junction:

wherein the one or more correction signals input the copy of the model, and one or more filtered correction signals output the copy of the model and are summed with the one or more of the error signals at the summing junction to form the one or more reference signals.

10. A system as recited in claim 9 further comprising a delay element that delays each reference signal before the reference signal inputs the error correlator as a regressor.

11. A system as recited in claim 3 wherein the delay element delays each reference signal an amount of time so that the delayed reference signal is in phase within 90° of the correlated filtered error signal.

12. A system as recited in claim 3 wherein the delay element delays each reference signal an amount of time that is an estimate of the effective response time of the auxiliary path.

13. A system as recited in claim 3 wherein the delay element delays each reference signal the same amount of time as a delay of the delayed Hermitian transpose.

14. A system as recited in claim 3 wherein the model of the auxiliary path has a series of tap weights in the time domain corresponding to each path between each adaptive filter output and each input to the error signal filer, each series of tap weights has the same fixed number of tap weights, and the delay element delays the reference signal an amount of time essentially equal to an amount of time represented by the fixed number of tap weights.

15. A system as recited in claim 1 wherein the model of the auxiliary path has a series of tap weights in the time domain corresponding to each path between each adaptive filter output and each input to the error signal filter, and the error signal filter has a filter channel for each model channel, the filter channel having a shifted and reversed series of tap weights.

16. A system as recited in claim 15 comprising not more than one output transducer and not more than one error sensor wherein the model has not more than one model channel, and the filter channel is a delayed complex conjugate of the model channel in the frequency domain.

17. A system as recited in claim 15 wherein the model channels are also transposed to form the filter channels in the error signal filter.

18. A system as recited in claim 17 wherein the error signal filter further has a summer corresponding to each filtered error signal.

19. A system as recited in claim 15 wherein each series of tap weights has the same fixed number of tap weights and the delay is determined according to the fixed number of tap weights.

20. A system as recited in claim 1 wherein the model of the auxiliary path is an adaptive model that adapts on-line, and the control system further comprises a random noise source.

21. A system as recited in claim 1 wherein the model of the auxiliary path models the auxiliary path over one or more selected frequencies only.

22. A system as recited in claim 1 wherein the adaptive filter is an FIR filter.

23. A system as recited in claim 1 wherein the adaptive filter is an IIR filter.

24. A system as recited in claim 1 wherein the adaptive control system is implemented in an active acoustic attenuation system, and the system input is an input acoustic wave, the control signal is a canceling acoustic wave and the system output is an output acoustic wave.

25. A system as recited in claim 24 wherein the active acoustic attenuation system is an active sound attenuation system, and the output transducer is a loudspeaker, and the error sensor is an error microphone.

26. A system as recited in claim 24 wherein the active acoustic attenuation system is an active vibration attenuation system, and the output transducer is a shaker and the error sensor is an accelerometer.

27. An adaptive control method in a system having a system input and a system output comprising the steps of:

adaptively generating n correction signals by processing m reference signals through an adaptive filter having n×m channels;

generating a control signal from each correction signal, the n control signals combining with the system input to yield the system output;

sensing the system output and generating p error signals in response thereto;

filtering the p error signals to generate n filtered error signals by inputting the p error signals to an error signal filter having n×p channels, the error signal filter being the delayed Hermitian transpose in the frequency domain of an auxiliary path model having p×n channels;

correlating each of the m reference signals with each of the n filtered error signals to generate a corresponding error input signal for each of the n×m channels in the adaptive filter; and adapting each of the n×m channels in the adaptive filter from the corresponding error input signal.

28. A method as recited in claim 27 further comprising the steps of:

delaying each of the m reference signals before correlating the reference signal with each of the n filtered error signals.

29. A method as recited in claim 27 wherein each of the n×p channels in the delayed Hermitian transpose is formed by taking the complex conjugate of the corresponding p×n channel in the n×p auxiliary path model.

30. A method as recited in claim 27 which is implemented in the time domain, wherein the p×n channels in the auxiliary path model are each a series of tap weights, and each of the n×p channels in the error signal filter is formed by reversing the order of the tap weights.

31. A method as recited in claim 30 further comprising the step of:

delaying each of the m reference signals before correlating the reference signal with each of the n filtered error signals.

32. A method as recited in claim 28 which is implemented in the time domain, wherein the p×n channels in the auxiliary path model are each a series of $N_c$ tap weights, and each reference signal is delayed the same amount of time as represented by $N_c$ taps.

33. A method as recited in claim 28 wherein each of the reference signals is delayed an amount of time that is an estimate of the effective response time of the auxiliary path.

34. A method as recited in claim 27 wherein the p×n auxiliary path model is generated adaptively on-line using a random noise source.

35. A method as recited in claim 27 wherein the p×n auxiliary path model models the auxiliary path over one or more selected frequencies only.

36. A method as recited in claim 27 where in the adaptive filter is an FIR filter.

37. A method as recited in claim 27 wherein the adaptive filter is an IIR filter.

38. A method as recited in claim 27 wherein the system is an active acoustic attenuation system, and the system input is an input acoustic wave, the n control signals are each a canceling acoustic wave, and the system output is an output acoustic wave.

39. A method as recited in claim 27 wherein the active acoustic attenuation system is an active sound attenuation system, and each of the n canceling acoustic waves is generated using a loudspeaker, and each of the p error signals is generated using a microphone.

40. A method as recited in claim 39 wherein the active acoustic attenuation system is an active vibration attenuation system, and each of the n canceling acoustic waves is generated using a shaker, and each of the p error signals is generated using an accelerometer.

41. A method as recited in claim 27 further comprising the step of measuring each of the m reference signals with an input sensor.

42. A method as recited in claim 41 further comprising the step of:

delaying each of the reference signals before correlating the reference signal with each of the n filtered error signals.

43. A method as recited in claim 27 further comprising the step of providing at least one of the error signals to the adaptive filter as at least one of the reference signals.

44. A method as recited in claim 43 further comprising the step of:

delaying each of the reference signals before correlating the reference signal with each of the n filtered error signals.

45. A method as recited in claim 27 further comprising the steps of:

filtering the n correction signals through a copy of the p×n auxiliary path model to generate p filtered correction signals; and adding at least one of the p filtered correction signals to the corresponding error signal to general p reference signals;

providing the p reference signals to the adaptive filter for processing.

46. A method as recited in claim 45 further comprising the step of:

delaying each of the reference signals before correlating the reference signal with each of the n filtered error signals.

47. A method as recited in claim 27 wherein the adaptive filter outputs not more than one correction signal, not more than one error signal is generated and the error signal filter has not more than one channel which is determined by taking a delayed complex conjugate of the auxiliary path model.

* * * * *